(12) United States Patent
Fischer et al.

(10) Patent No.: US 7,641,975 B2
(45) Date of Patent: Jan. 5, 2010

(54) HARDENERS

(75) Inventors: Wolfgang Fischer, Meerbusch (DE); Markus Mechtel, Bergisch Gladbach (DE); Jan Weikard, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 406 days.

(21) Appl. No.: 11/003,651

(22) Filed: Dec. 3, 2004

(65) Prior Publication Data

US 2005/0123768 A1 Jun. 9, 2005

(30) Foreign Application Priority Data

Dec. 9, 2003 (DE) ................. 103 57 712

(51) Int. Cl.
*B32B 27/30* (2006.01)
*B32B 27/38* (2006.01)
*C08L 33/00* (2006.01)
*C08L 63/00* (2006.01)
*C08L 75/00* (2006.01)

(52) U.S. Cl. ............. 428/423.1; 428/413; 428/422.8; 428/521; 428/522; 522/90; 522/92; 525/123; 528/73; 528/75

(58) Field of Classification Search ........ None
See application file for complete search history.

(56) References Cited

U.S. PATENT DOCUMENTS

| | | | | |
|---|---|---|---|---|
| 3,701,679 A | * | 10/1972 | Johnsojn et al. ............. 427/500 |
| 3,719,522 A | * | 3/1973 | Johnson et al. ............. 427/500 |
| 4,522,981 A | * | 6/1985 | Geist ............................ 525/124 |
| 4,879,402 A | * | 11/1989 | Reiners et al. ................ 560/26 |
| 5,008,436 A | | 4/1991 | Müller et al. ................. 560/26 |
| 5,234,970 A | * | 8/1993 | Kyle ............................ 522/96 |
| 5,710,214 A | * | 1/1998 | Chou et al. ................. 525/124 |
| 5,739,251 A | * | 4/1998 | Venham et al. ............... 528/49 |
| 6,153,788 A | * | 11/2000 | Fischer et al. ............... 560/224 |
| 6,465,539 B1 | * | 10/2002 | Weikard et al. ............... 522/90 |
| 6,500,876 B2 | * | 12/2002 | Weikard et al. ............... 522/92 |
| 6,599,955 B1 | * | 7/2003 | Weikard et al. ............... 522/90 |
| 6,617,413 B1 | * | 9/2003 | Bruchmann et al. .......... 528/75 |
| 6,632,880 B2 | * | 10/2003 | Barsotti et al. ................ 525/64 |
| 7,144,955 B2 | * | 12/2006 | Grace et al. ................. 525/124 |

FOREIGN PATENT DOCUMENTS

| | | |
|---|---|---|
| CA | 2 258 813 | 7/1999 |
| DE | 33 16 592 A1 | 11/1984 |
| DE | 40 40 290 A1 | 7/1992 |
| DE | 199 19 826 A1 | 11/2000 |

OTHER PUBLICATIONS

Analytical Science, vol. 17, Nov. 2001, pp. 1295-1299, Morikatsu Matsunage et al, "Optimization of Conditions for Detaliled Compositional Analysis of Acrylic Oligomers by Supercritical Fluid Chromatography with Temeprature Programing or Modifier Gradient Technique".
Chemistry & Technology of UV & EB Formulation for Coatings, Inks & Paints, vol. 2, (month unavailable) 1991, pp. 37-56, P.K.T. Olding (Ed.), "Epoxy Acrylates".
Chemistry & Technology of UV & EB Formulation for Coatings, Inks & Paints, vol. 2, (month unavailable) 1991, pp. 123-135, P.K.T. Olding (Ed.), "Polyester Acrylates".

* cited by examiner

*Primary Examiner*—James Seidleck
*Assistant Examiner*—John J Figueroa
(74) *Attorney, Agent, or Firm*—Connolly Bove Lodge & Hutz LLP

(57) ABSTRACT

A process for the preparation of dual-cure hardeners, coating systems which contain these hardeners, and the use of these coating systems, as well as substrates coated with these coating agents. The dual-cure hardeners are prepared by reacting at least one diisocyanate or polyisocyanate A with the product B of the reaction of B1 acrylic acid, methacrylic acid and/or dimeric acrylic acid with B2 glycidyl methacrylate and/or glycidyl acrylate, wherein B contains less than 0.2 wt. % of epoxide groups.

13 Claims, No Drawings

HARDENERS

CROSS REFERENCE TO RELATED PATENT APPLICATION

The present patent application claims the right of priority under 35 U.S.C. §119 (a)-(d) of German Patent Application No. 103 57 712.2, filed Dec. 9, 2003.

BACKGROUND OF THE INVENTION

1. Field of the Invention

The present invention relates to a novel process for the preparation of dual-cure hardeners, as well as to coating systems which contain these hardeners, and the use of these coating systems.

2. Description of the Prior Art

The dual-cure hardeners obtainable according to the invention arise from the reaction of certain hydroxyalkyl (meth) acrylates with polyisocyanates. (Meth)acrylates within the meaning of the present invention are esters of acrylic acid or methacrylic acid and mixtures thereof. Hydroxyalkyl (meth) acrylates are used, inter alia, for the preparation of hardeners for two-component or multi-component coating systems which cure by radical polymerisation and addition reaction of isocyanates with suitable co-reactants. The radical polymerisation can here be initiated by actinic radiation. The combination of hardening by two reaction mechanisms is designated "dual-cure" by those skilled in the art.

Advantageous dual-cure systems contain molecules which have available both one or more isocyanate groups and at least one radically polymerisable double bond. Such molecules are designated dual-cure hardeners by those skilled in the art. Such hardeners are generally prepared by the reaction of polyisocyanates with hydroxyalkyl (meth)acrylates. In order to obtain particularly highly cross-linked coatings, it is expedient to use hardeners which have high functionality in particular in terms of radically polymerisable double bonds, and which can be advantageously prepared by the use of hydroxyalkyl (meth)acrylates which have a high functionality in terms of acrylate and/or methacrylate groups. In order to obtain a targeted molecular structure of the dual-cure hardener, it is furthermore expedient to use hydroxyalkyl (meth) acrylates whereof the hydroxy-functionality is distributed as narrowly as possible and is close to one. It is possible as a result of this targeted molecular structure to provide, inter alia, hardeners which are distinguished by a low viscosity. Therefore the preparation of the hydroxyalkyl (meth)acrylates by esterification of polyols such as trimethylolpropane or pentaerythritol with (meth)acrylic acid as a process which proceeds randomly and generates a broader distribution of the hydroxy-functionality is disadvantageous. Furthermore, by-products having higher molecular weight, which have been identified as products of an addition reaction between hydroxyl groups and the C-C double bonds of acrylates, for example in Analytical Sciences, November 2001, Vol. 17, pp. 1295-1299, frequently form.

DE-A 19 860 041 discloses 3-acryloyloxy-2-hydroxypropyl methacrylate as a possible compound for a reaction with polyisocyanates for the preparation of dual-cure hardeners. These are prepared by catalysed allophanation with an excess of hexamethylene diisocyanate (HDI) followed by distillation of the excess HDI. However, because of the risk of spontaneous polymerisation, the distillation of HDI in the presence of acrylate groups or methacrylate groups is highly critical, and industrially—if this is indeed possible at all—is associated with very high costs and is therefore uneconomic. This specification makes no mention of the preparation or purification, or of the necessary purity or sourcing, of 3-acryloyloxy-2-hydroxypropyl methacrylate.

The literature generally describes the preparation of 3-acryloyloxy-2-hydroxypropyl methacrylate by the reaction of glycidyl methacrylate with acrylic acid, both commercially available at high purity, with suitable catalysis. No data regarding the purification/purity of the product are provided. For instance, EP-A 0 900 778 describes the reaction of excess acrylic acid following esterification reactions with glycidyl methacrylate catalysed with benzyltriethylammonium chloride. Although 3-acryloyloxy-2-hydroxypropyl methacrylate is commercially obtainable from fine chemicals suppliers (Sigma-Aldrich GmbH, Steinheim, Germany), the purity determined by gel permeation chromatography is below 50 wt. %, in particular undesirable constituents of higher molecular weight are found in the product. The preparation process is unknown. When the commercially obtainable product, and also the product prepared by benzyltriethylammonium chloride catalysis, is reacted with polyisocyanates to obtain dual-cure hardeners, contrary to expectations stable products are not obtained (see Comparison Examples V11 and V3).

After purification by distillation 3-methacryloyloxy-2-hydroxypropyl methacrylate of greater than 85 wt. % purity is marketed by Röhm, Darmstadt, Germany. The stability of the product is low, the product must be stored in a cool place, thus hampering use on an industrial scale. The stability of reaction products of this 3-methacryloyloxy-2-hydroxypropyl methacrylate with polyisocyanates to obtain dual-cure hardeners is very low (see Comparison Example V12).

The object was therefore to provide a process by which storage-stable reaction products of, for example, 3-acryloyloxy-2-hydroxypropyl methacrylate with polyisocyanates can be obtained which are suitable as hardeners in dual-cure coating systems.

SUMMARY OF THE INVENTION

The present invention provides a process for preparing dual-cure hardeners that includes reacting a reaction mixture containing at least one diisocyanate or polyisocyanate A with the product B of the reaction of B1 acrylic acid, methacrylic acid and/or dimeric acrylic acid with B2 glycidyl methacrylate and/or glycidyl acrylate, wherein B contains less than 0.2 wt. % of epoxide groups.

The present invention is also directed to a one-component or multi-component coating agent that includes C1) one or more polyisocyanates obtained according to the process described above, and C2) one or more compounds which have at least one isocyanate-reactive group and optionally comprise one or more functional groups which under the influence of actinic radiation react with ethylenically unsaturated compounds, with polymerisation.

The present invention is further directed to a method of coating a substrate by applying the above-described coating agents to at least a portion of the substrate as well as to substrates coated according to the method.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The present invention is directed to a process by which storage-stable reaction products of, for example, 3-acryloyloxy-2-hydroxypropyl methacrylate with polyisocyanates can be obtained which are suitable as hardeners in dual-cure coating systems.

The present invention therefore provides a process for the preparation of dual-cure hardeners by the reaction of at least one diisocyanate or polyisocyanate A with the product B of the reaction of B 1 acrylic acid, methacrylic acid and/or dimeric acrylic acid with B2 glycidyl methacrylate and/or glycidyl acrylate, characterised in that B contains less than 0.2 wt. % of epoxide groups (calculated as M=42) and has an acid value of less than 10 mg KOH/g.

The present invention also provides one-component or multi-component coating agents comprising C1) one or more polyisocyanates prepared by the process according to the invention and C2) one or more compounds which have at least one isocyanate-reactive group and optionally comprise one or more functional groups which under the influence of actinic radiation react with ethylenically unsaturated compounds, with polymerisation, C3) optionally further polyisocyanates different from (C1), which optionally comprise one or more functional groups which under the influence of actinic radiation react with ethylenically unsaturated compounds, with polymerisation, C4) optionally compounds bearing functional groups which under the influence of actinic radiation react with ethylenically unsaturated compounds, with polymerisation, and which have neither isocyanate groups nor isocyanate-reactive groups, C5) optionally catalysts and C6) optionally auxiliary agents and additives, C7) optionally products of reactions between the components C1) to C6).

The present invention also provides the use of these coating agents for the coating of a very wide variety of substrates, as well as substrates which themselves are coated with these coating agents.

Diisocyanates or polyisocyanates A are aromatic, araliphatic, aliphatic or cycloaliphatic diisocyanates or polyisocyanates. Mixtures of such diisocyanates or polyisocyanates may also be utilised. Examples of suitable diisocyanates or polyisocyanates are butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof having any isomer content, isocyanatomethyl-1,8-octane diisocyanate, 1,4-cyclohexylene diisocyanate, the isomeric cyclohexane dimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane-4,4',4"-triisocyanate or derivatives thereof having urethane, urea, carbodiimide, acylurea, isocyanurate, allophanate, biuret, oxadiazine trione, uretdione, iminooxadiazine dione structure and mixtures thereof. Polyisocyanates based on oligomerised and/or derivatised diisocyanates from which excess diisocyanate has been removed by suitable processes are preferred, in particular those of hexamethylene diisocyanate, isophorone diisocyanate and of the isomeric bis(4,4'-isocyanatocyclohexyl) methanes, as well as mixtures thereof. The oligomeric isocyanurates and iminooxadiazine diones of HDI and mixtures thereof, as well as the oligomeric isocyanurates of IPDI, are particularly preferred.

It is optionally also possible to react the aforementioned isocyanates partially with blocking agents known from coating technology to those skilled in the art. The following might be named as examples of blocking agents: alcohols, lactams, oximes, malonic esters, alkyl acetoacetates, triazoles, phenols, imidazoles, pyrazoles, as well as amines such as, for example, butanone oxime, diisopropylamine, 1,2,4-triazole, dimethyl-1,2,4-triazole, imidazole, malonic acid diethyl ester, ethyl acetoacetate, acetone oxime, 3,5-dimethyl pyrazole, ε-caprolactam, N-tert.-butyl-benzylamine, cyclopentanone carboxyethyl ester or any mixtures of these blocking agents.

The reaction product B is prepared by the reaction of acrylic acid, methacrylic acid and/or dimeric acrylic acid with glycidyl acrylate and/or glycidyl methacrylate. The reaction product of glycidyl methacrylate with acrylic acid is preferred. The reaction of the acid with the glycidyl compound takes place in an equivalence ratio of from 0.90 to 1.00 to 1.30 to 1.00, however preferably from 1.01 to 1.00 to 1.20 to 1.00. The reaction is preferably catalysed, with it being advantageous to add a smaller partial quantity of the catalyst towards the end of the reaction in order to obtain as complete a conversion as possible. The compounds known from the literature as catalysts for the reaction of glycidyl compounds with carboxylic acids, such as, for example, tertiary amines, tertiary phosphines, ammonium compounds and phosphonium compounds, thiodiglycol, tin compounds, chromium compounds, potassium compounds and caesium compounds are considered as catalysts. Those which are free from amine compounds or ammonium compounds are preferred. Triphenyl phosphine is in particular preferred. The reaction is preferably carried out in the presence of stabilisers for acrylates and methacrylates. Besides oxygen-containing gas, chemical stabilisers for avoiding premature polymerisation are suitable in quantities of from 0.01 to 1 wt. %, preferably 0.1 to 0.5 wt. %, in relation to the quantity of unsaturated compounds. Such stabilisers are described in, for example, Houben-Weyl, Methoden der Organischen Chemie [Organic Chemistry Methods], $4^{th}$ edition, Vol. XIV/1, Georg-Thieme-Verlag, Stuttgart 1961, pp. 433 et seq. Examples which might be named are: sodium dithionite, sodium hydrogen sulfide, sulfur, hydrazine, phenyl hydrazine, hydrazobenzene, N-phenyl-β-naphthylamine, N-phenyl-ethanoldiamine, dinitrobenzene, picric acid, p-nitroso-dimethylaniline, diphenyl nitrosamine, phenols such as para-methoxyphenol, 2,5-di-tert.-butyl hydroquinone, 2,6-di-tert.-butyl-4-methylphenol, p-tert.-butylcatechol or 2,5-di-tert.-amyl hydroquinone, tetramethylthiuram disulfide, 2-mercaptobenzthiazole, dimethyldithiocarbamic acid sodium salt, phenothiazine, N-oxyl compounds such as, for example, 2,2,6,6-tetramethylpiperidine-N-oxide (TEMPO) or one of the derivatives thereof. 2,6-Di-tert.-butyl-4-methylphenol and para-methoxyphenol, as well as mixtures thereof, are preferred.

The reaction may be carried out in the presence of an organic solvent which is inert to educts and products and is preferably also inert to isocyanates. Examples are paint solvents such as butyl acetate, solvent naphtha, methoxypropyl acetate or hydrocarbons such as cyclohexane, methylcyclohexane or isooctane. After the reaction has finished the solvent may be removed, for example by distillation, or may remain in the reaction product B. The use of solvent for the preparation of B is preferably omitted. The components may be reacted in any sequence. Preferably, one component is the initial charge, to which the main quantity of the catalyst and the stabiliser are added, and heating takes place, with stirring. The other component is then dispensed in all at once or preferably gradually, with as constant a temperature as possible being held by heating and heat of reaction. The degree of conversion is determined by analysis. This may be by spectroscopy, for example by running infrared or near infrared spectra, however chemical analyses may also be carried out on extracted samples. The acid content and the epoxide content are in particular a suitable measure of the reaction conversion. Dispensing and the reaction are carried out at a temperature of between 60° C. and 140° C., preferably between 70° C. and 120° C., particularly preferably between 80° C. and 95° C. The reaction is preferably carried out until an epoxide content of less than 0.2 wt. %, preferably less than 0.1 wt. % (calculated as M=42), and an acid number of less than 10 mg KOH/g, particularly preferably less than 5 mg KOH/g are obtained. If the reaction is terminated before this, it is possible, for example by applying a vacuum or passing through a gas, which preferably contains oxygen, for the residual educt content to be reduced such that correspondingly low epoxide and oxygen contents are obtained. It is likewise possible to lower the epoxide content by the addition of small quantities of epoxide-reactive compounds such as stronger acids, for example butyl phosphate. In an analogous manner, residual acid contents can be reduced, for example by reaction with carbodiimides or aziridines.

The products B which arise may be reacted further immediately or may first be stored or transported. The further reaction preferably takes place with the polyisocyanates A without further purification such as, for example, extraction or distillation. The constituents content of B, which according to gel permeation chromatography has an oligomeric or polymeric character, is preferably less than 35, particularly preferably less than 25 wt. %.

The reaction of A with B is preferably a urethanisation. Besides urethanisation, an allophanation of oxadiazine trione group-containing polyisocyanates A with B is, for example, also possible, in which with suitable catalysis carbon dioxide is liberated. Following the reaction of A with B, further reactions which are known from diisocyanate and polyisocyanate chemistry are possible, such as, for example, further urethanisation, and/or allophanation, biuretisation, trimerisation, urea formation and/or uretdionisation, optionally with the addition of compounds which are reactive with isocyanates, such as hydroxyl or amino compounds. In particular, isocyanate groups which are still free can be reacted with blocking agents known to those skilled in the art from coating technology. The following might be named as examples of blocking agents: alcohols, lactams, oximes, malonic esters, alkyl acetoacetates, triazoles, phenols, imidazoles, pyrazoles, as well as amines, such as, for example, butanone oxime, diisopropylamine, 1,2,4-triazole, dimethyl-1,2,4-triazole, imidazole, malonic acid diethyl ester, ethyl acetoacetate, acetone oxime, 3,5-dimethyl pyrazole, ε-caprolactam, N-tert.-butyl-benzylamine, cyclopentanone carboxyethyl ester or any mixtures of these blocking agents. The introduction of hydrophilising or potentially hydrophilising groups is furthermore possible if, for example, it is desired to use the reaction products in water-based coating systems.

Additional quantities of diisocyanates named under A may furthermore be added for a possible further reaction. It is also possible to remove unreacted diisocyanates by separation processes such as, for example, distillation.

Since polyisocyanates based on oligomerised diisocyanates from which excess diisocyanate has been removed by suitable processes are preferably utilised as A, the reaction products A with B preferably contain less than 0.5 wt. %, particularly preferably less than 0.2 wt. % of monomeric diisocyanates. If the reaction products are to be utilised for the preparation of hardeners of the dual-cure type, the equivalence ratios for the reaction A with B are selected such that the reaction product still contains free or blocked isocyanate groups. Here, an isocyanate group content (M=42) of from 0.5 to 25, in particular of 3.0 to 12.0 wt. %, is particularly preferred. The process according to the invention is also suitable for the preparation of reaction products of A and B which contain no free or blocked isocyanate groups. These can be utilised for the preparation of photochemically cross-linkable compositions.

The reaction A with B may take place with the aid of the catalysts which are known for accelerating the isocyanate addition reaction, such as, for example, tertiary amines, tin compounds, zinc compounds or bismuth compounds, in particular triethylamine, 1,4-diazabicyclo-[2,2,2]-octane, bismuth octoate or dibutyltin dilaurate, which may be present initially or dispensed in later.

Furthermore, the addition of stabilisers may be expedient. The compounds already named hereinabove for the stabilisation of (meth)acrylates are considered, as well as compounds which stabilise the isocyanates from further reactions other than those which are desired. Examples of the latter are in particular acids or acid derivatives, for example benzoyl chloride, phthaloyl chloride, phosphinous, phosphonous and/or phosphorous acid, phosphinic, phosphonic and/or phosphoric acid as well as the acid esters of the 6 acid types just named, sulfuric acid and acid esters thereof and/or sulfonic acids. The stabilisers may be added before, during and/or after the reaction.

The reaction may be carried out in the presence of organic solvents and/or reactive thinners, which are inert with regard to educts and products. Examples of solvents are in particular paint solvents such as ethyl acetate, butyl acetate, solvent naphtha from Exxon-Chemie as aromatic-containing solvents, and/or methoxypropyl acetate as well as acetone, butanone. After the reaction has finished, the solvent can be removed, for example by distillation, or can preferably remain in the reaction product B. Appropriate solvents can—if desired—also be added after the reactions. In addition to solvents, reactive thinners can also be used. Such reactive thinners are, for example, those compounds known in radiation curing technology (cf. Römpp Lexikon Chemie, p. 491, $10^{th}$ edition. 1998, Georg-Thieme-Verlag, Stuttgart), in particular those which have low hydroxyl contents of less than 30, preferably less than 10 mg KOH/g. The following might be named by way of example: esters of acrylic acid or of methacrylic acid, preferably of acrylic acid, with the following alcohols: monohydric alcohols such as the isomeric butanols, pentanols, hexanols, heptanols, octanols, nonanols and decanols, furthermore cycloaliphatic alcohols such as isobornol, cyclohexanol and alkylated cyclohexanols, dicyclopentanol, arylaliphatic alcohols such as phenoxyethanol and nonylphenyl ethanol, as well as tetrahydrofurfuryl alcohols. Furthermore, alkoxylated derivatives of these alcohols can be used, dihydric alcohols such as, for example, ethylene glycol, 1,2-propanediol, 1,3-propanediol, diethylene glycol, dipropylene glycol, the isomeric butanediols, neopentyl glycol, 1,6-hexanediol, 2-ethylhexanediol and tripropylene glycol, or also alkoxylated derivatives of these alcohols. Preferred dihydric alcohols are 1,6-hexanediol, dipropylene glycol and tripropylene glycol. Esters of polyhydric alcohols such as glycerol, trimethylolpropane, ditrimethylolpropane, pentaerythritol or dipentaerythritol, or alkoxylated derivatives thereof, can likewise be utilised.

The reaction of A with B takes place either in continuous manner, for example in a static mixer, or in discontinuous manner, for example in a suitable stirred vessel. If the procedure is discontinuous, A and B can both be the initial charge into which the respective other component is dispensed at room temperature or at elevated temperature. By means of heating and/or exothermic reaction, the reaction is preferably held within the temperature range of between 40° C. and 130° C., in particular 60° C. to 80° C. The degree of conversion is determined analytically. This may be by spectroscopy, for example by running infrared or near infrared spectra, however chemical analyses can also be carried out on extracted samples. The isocyanate content, optionally also the hydroxyl content, is in particular suitable as a measure of the reaction conversion.

Preferred reaction products of A with B have a double bond density (acrylate and methacrylate) of 1.0 or more, preferably 2.0 or more, mole C=C per kg (in relation to non-volatile constituents).

The present invention also provides one-component or multi-component coating agents comprising C1) one or more polyisocyanates prepared by the process according to the invention and
C2) one or more compounds which have at least one isocyanate-reactive group and optionally comprise one or more functional groups which under the influence of actinic radiation react with ethylenically unsaturated compounds, with polymerisation,
C3) optionally further polyisocyanates which optionally comprise one or more functional groups, which under the influence of actinic radiation react with ethylenically unsaturated compounds, with polymerisation,
C4) optionally compounds bearing functional groups which under the influence of actinic radiation react with ethylenically unsaturated compounds, with polymerisation, which have neither isocyanate groups nor isocyanate-reactive groups,
C5) optionally catalysts and
C6) optionally auxiliary agents and additives,
C7) optionally products of reactions between the components C1) to C6).

The compounds of the component C2) can be monomeric, oligomeric or polymeric and comprise at least one, preferably two or more, groups which are reactive with isocyanates.

Suitable compounds of the component C2) are low molecular weight short-chain—that is to say comprising 2 to 20 carbon atoms—aliphatic, araliphatic or cycloaliphatic diols, triols and/or higher polyols. The following are examples of diols: ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropionic acid-(2,2-dimethyl-3-hydroxylpropyl ester). Examples of suitable triols are trimethylolethane, trimethylolpropane and glycerol. Suitable higher-functional alcohols are ditrimethylolpropane, pentaerythritol, dipentaerythritol and sorbitol.

Higher molecular weight polyols such as polyester polyols, polyether polyols, hydroxy-functional acrylic resins, hydroxy-functional polyurethanes or corresponding hydrides (cf. Römpp Lexikon Chemie, pp. 465-466, $10^{th}$ edition 1998, Georg-Thieme-Verlag, Stuttgart) are also suitable.

Furthermore, all compounds which have at least one group which is reactive to isocyanates and at least one unsaturated function which under the influence of actinic radiation reacts with ethylenically unsaturated compounds, with polymerisation, can be used individually or in any mixtures as compounds of the component C2).

α,β-Unsaturated carboxylic acid derivatives such as acrylates, methacrylates, maleates, fumarates, maleimides, acrylamides, as well as vinyl ethers, propenyl ethers, allyl ethers and compounds containing dicyclopentadienyl units, which have at least one group which is reactive to isocyanates, are preferably utilised, these are particularly preferably acrylates and methacrylates having at least one isocyanate-reactive group.

The following are considered as hydroxy-functional acrylates or methacrylates, for example: compounds such as 2-hydroxyethyl(meth)acrylate, polyethylene oxide mono(meth) acrylates, polypropylene oxide mono(meth)acrylates, polyalkylene oxide mono(meth)acrylates, poly(ε-caprolactone)mono(meth)acrylates, such as, for example, Tone® M100 (Dow, USA), 2-hydroxypropyl(meth)acrylate, 4-hydroxybutyl(meth)acrylate, 3-hydroxy-2,2-dimethylpropyl (meth)acrylate, the hydroxy-functional monoacrylates, diacrylates or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or technical mixtures thereof.

Moreover, isocyanate-reactive oligomeric or polymeric unsaturated acrylate group- and/or methacrylate group-containing compounds are suitable alone or in combination with the aforementioned monomer compounds. Here, hydroxyl group-containing polyester acrylates having an OH content of from 30 to 300 mg KOH/g, preferably 60 to 200, particularly preferably 70 to 120 mg KOH/g are preferably utilised.

The preparation of polyester acrylates is described in DE-A 4 040 290 (p. 3, line 25-p. 6, line 24), DE-A 3 316 592 (p. 5, line 14-p. 11, line 30) and P. K. T. Oldring (Ed.), Chemistry & Technology of UV and EB Formulations for Coatings, Inks and Paints, Vol. 2, 1991, SITA Technology, London, pp. 123-135.

The following can likewise be used: the—known per se—hydroxyl group-containing epoxy(meth)acrylates having OH contents of from 20 to 300 mg KOH/g, preferably 100 to 280 mg KOH/g, particularly preferably 150 to 250 mg KOH/g or hydroxyl group-containing polyurethane(meth) acrylates having OH contents of from 20 to 300 mg KOH/g, preferably 40 to 150 mg KOH/g, particularly preferably 50 to 100 mg KOH/g, or acrylated polyacrylates having OH contents of from 20 to 300 mg KOH/g, preferably 40 to 150 mg KOH/g, particularly preferably 50 to 100 mg KOH/g, as well as intermixtures thereof and mixtures with hydroxyl group-containing unsaturated polyesters as well as mixtures with polyester(meth)acrylates or mixtures of hydroxyl group-containing unsaturated polyesters with polyester(meth)acrylates. Such compounds are likewise described in P. K. T. Oldring (Ed.), Chemistry & Technology of UV and EB Formulations for Coatings, Inks and Paints, Vol. 2, 1991, SITA Technology, London, pp. 37-56. Hydroxyl group-containing epoxy(meth) acrylates are based in particular on reaction products of acrylic acid and/or methacrylic acid with epoxides (glycidyl compounds) of monomeric, oligomeric or polymeric bisphenol-A, bisphenol-F, hexanediol and/or butanediol or ethoxylated and/or propoxylated derivatives thereof. Acrylated polyacrylates can be prepared by, for example, the reaction of glycidyl-functional polyacrylates with (meth)acrylic acid.

Polyisocyanates within the meaning of C3) are based on the isocyanates already named above in A, including the preferred ranges mentioned there. When blocking agents are used all the isocyanate groups can be blocked. The polyisocyanates C3) can optionally contain one or more functional groups which under the influence of actinic radiation react with ethylenically unsaturated compounds, with polymerisation. These groups can be prepared by methods which are known per se by reacting the unsaturated and isocyanate-reactive compounds named under C2) with saturated polyisocyanates, with the monomeric unsaturated and isocyanate-reactive compounds named under C2) being preferred.

Polymers such as polyacrylates, polyurethanes, polysiloxanes, as well as compounds which under the influence of actinic radiation react with ethylenically unsaturated compounds, with polymerisation, can be utilised as compounds of the component C4). Such groups are α,β-unsaturated carboxylic acid derivatives such as acrylates, methacrylates, maleates, fumarates, maleimides, acrylamides, furthermore vinyl ethers, propenyl ethers, allyl ethers and compounds containing dicyclopentadienyl units. Acrylates and methacrylates are preferred. Examples are contained in the reactive thinners known in radiation curing technology (cf. Römpp Lexikon Chemie, p. 491, $10^{th}$ edition 1998, Georg-Thieme-Verlag, Stuttgart) or the binders known in radiation curing technology such as polyether acrylates, polyester acrylates, urethane acrylates, epoxyacrylates, melamine acrylates, silicone acrylates, polycarbonate acrylates and acrylated polyacrylates, where these have a hydroxyl group content of less than 30, preferably less than 20, particularly preferably less than 10 mg KOH/g.

Compounds which might be named by way of example as a constituent of C4) are the esters of acrylic acid or methacrylic acid, preferably of acrylic acid, with the following alcohols: monohydric alcohols such as the isomeric butanols, pentanols, hexanols, heptanols, octanols, nonanols and decanols, furthermore cycloaliphatic alcohols such as isobornol, cyclohexanol and alkylated cyclohexanols, dicyclopentanol, arylaliphatic alcohols such as phenoxyethanol and nonylphenyl ethanol, as well as tetrahydrofurfuryl alcohols. Furthermore, alkoxylated derivatives of these alcohols can be used. Dihydric alcohols such as, for example, ethylene glycol, 1,2-propanediol, 1,3-propanediol, diethylene glycol, dipropylene glycol, the isomeric butanediols, neopentyl glycol, 1,6-hexanediol, 2-ethylhexanediol and tripropylene glycol, or also alkoxylated derivatives of these alcohols. Preferred dihydric alcohols are 1,6-hexanediol, dipropylene glycol and tripropylene glycol. Polyhydric alcohols are glycerol, trimethylolpropane, ditrimethylolpropane, pentaerythritol or dipentaerythritol or alkoxylated derivatives thereof.

In order to accelerate the curing of the unblocked or blocked isocyanates with the respective active hydrogen-containing co-reactants such as alcohols, amines and the mixed alcohol- and amine-containing co-reactants, the catalysts known in isocyanate chemistry can be co-used as a constituent of C5). Here, in the case of unblocked isocyanates, the following are suitable: tertiary amines, tin compounds, zinc compounds or bismuth compounds, in particular triethylamine, 1,4-diazabicyclo-[2,2,2]-octane, tin dioctoate or dibutyltin dilaurate. In the case of blocked isocyanates, at least divalent ions of Lewis acids, for example salts of zinc, of titanium, of zirconium and of bismuth, are suitable.

The quantity of the catalyst C5) can be adjusted to the requirements of curing by those skilled in the art, wherein in particular the curing temperature, the required curing speed and, in the case of free isocyanate groups, optionally the pot life, should be taken into account. Suitable quantities are, for example, from 0.01 to 2 wt. %, the use of from 0.05 to 1 wt. % is preferred, from 0.07 to 0.6 wt. % catalyst is particularly preferred, in relation to total solids.

Additives or auxiliary agents which are conventional in varnish, paint, printing ink, sealant and adhesive technology can be comprised as the component C6). These also embrace initiators which are activatable by actinic radiation, which initiate a radical polymerisation of the corresponding polymerisable groups. Photoinitiators which are activated by UV or visible light are preferred here. Such photoinitiators are commercially marketed compounds which are known per se, with a distinction being made between unimolecular (type I) and bimolecular (type II) initiators. Suitable (type I) systems are, for example, aromatic ketone compounds, for example benzophenones in combination with tertiary amines, alkyl benzophenones, 4,4'-bis(dimethylamino)benzophenone (Michler's ketone), anthrone and halogenated benzophenones or mixtures of the named types. (Type II) initiators such as benzoin and derivatives thereof, benzilketals, acylphosphine oxides, for example 2,4,6-trimethyl-benzoyl-diphenyl phosphine oxide, bisacyl phosphine oxides, phenylglyoxylic acid ester, camphorquinone, α-aminoalkylphenones, α,α-dialkoxyacetophenones and α-hydroxyalkylphenones are furthermore suitable. If the coating agent according to the invention is to be processed as a water-based agent, photoinitiators which are readily incorporatable into water-based coating agents are preferably used. Such products are, for example, Irgacure® 500, Irgacure® 819 DW (Ciba, Lampertheim, Germany), Esacure® KIP (Lamberti, Aldizzate, Italy). Mixtures of these compounds can also be utilised.

If the curing of the polymerisable constituents is to be thermally initiated, peroxy compounds such as diacyl peroxides are suitable as compounds of the component C6), for example benzoyl peroxide, alkylhydroperoxide such as diisopropylbenzene monohydroperoxide, alkyl peresters such as tert.-butylperbenzoate, dialkylperoxides such as di.-tert.-butyl peroxide, inorganic peroxides such as ammonium peroxodisulfate, potassium peroxodisulfate, peroxydicarbonates such as dicetyl peroxydicarbonate, or also azo compounds such as 2,2'-azobis[N-(2-propenyl)-2-methylpropionamide], 1-[(cyano-1-methylethyl)azo] formamides, 2,2'-azobis(N-butyl-2-methylpropionamide), 2,2'-azobis(N-cyclohexyl-2-methylpropionamide), 2,2'-azobis{2-methyl-N-[2-(1-hydroxybutyl)]propionamide}, 2,2'-azobis{2-methyl-N-[1,1-bis(hydroxymethyl)-2-hydroxyethyl]propionamide, furthermore also benzopinacol and derivatives thereof. For water-based coating systems compounds are preferred which are water-soluble or are present as aqueous emulsions. These radical formers can be combined with accelerators in known manner.

Additives which are furthermore usable are stabilisers, light stabilisers such as UV absorbers and sterically hindered amines (HALS), furthermore antioxidants, fillers as well as paint additives, for example, anti-sedimentation agents, anti-foams and/or wetting agents, flow promoters, reactive thinners, plasticisers, catalysts, co-solvents and/or thickeners as well as pigments, dyes and/or flatting agents already described under B). The utilisation of light stabilisers, and the various types, are described by way of example in A. Valet, Lichtschutzmittel für Lacke [Light Stabilisers for Coatings], Vincentz Verlag, Hanover, 1996.

The coating agents according to the invention can be applied to a very wide variety of substrates by the conventional techniques such as, for example, spray, roller or knife application, flooding, spraying, brushing, impregnation or dipping, or by printing techniques such as gravure, flexographic or offset printing, as well as by transfer methods. Suitable substrates are, for example, wood, metal, in particular also metal such as is used in the applications of so-called wire, coil, can or container coating, furthermore plastics also in the form of film, in particular, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviated names in accordance with DIN 7728 Part 1), paper, leather, textiles, felt, glass, wood, wood materials, cork, inorganically bonded substrates such as wood cement boards and asbestos cement boards, electronic component assemblies or mineral substrates. Substrates which consist of various of the aforementioned materials, or substrates which are already coated, can also be coated. It is also possible to apply the coating agents only in temporary manner to a substrate, then to partially or completely cure them and then detach them again, in order, for example, to prepare films. The coating agents according to the invention are in particular suitable for use in the coating of vehicles, in particular automotive bodies or add-on parts, preferably in the form of clear coats.

The layer thicknesses as applied (before curing) are typically between 0.5 and 5000 µm, preferably between 5 and 1500 µm, particularly preferably between 15 and 1000 µm. When solvents are used this is removed after application by the usual methods.

The radiation curing preferably takes place under the influence of high-energy radiation, thus UV radiation or daylight, for example light having a wavelength of 200 to 750 nm, or by irradiation with high-energy electrons (electron radiation, 90 to 300 keV). High-pressure mercury vapour lamps, for example, serve as radiation sources for light or UV light, wherein the mercury vapour can be modified by doping with other elements such as gallium or iron. Lasers, pulsed lamps (known as UV flash light sources), halogen lamps or eximer sources are likewise utilisable. The sources can be installed in a fixed position, such that the item to be irradiated is moved past the radiation source by means of a mechanical device, or the sources can be movable, and the item to be irradiated does not change location during curing. The radiation dose which is normally sufficient for cross-linking in UV curing is within the range 80 to 5000 mJ/cm$^2$.

The irradiation can optionally be carried out with the exclusion of oxygen, for example under an inert gas atmosphere or oxygen-reduced atmosphere. Nitrogen, carbon dioxide, noble gases or combustion gases are preferably suitable as inert gases. The irradiation can furthermore take place with the coating being covered with radiation-transparent media. Examples of these are, for example, plastics films, glass or liquids like water.

Depending on the radiation dose and the curing conditions, the type and concentration of the optionally used initiator can be varied and/or optimised in a manner known to those skilled in the art or by means of preliminary orienting experiments.

Mercury high-pressure sources in fixed-position installations are particularly preferably utilised for curing. Photoinitiators are then utilised at concentrations of from 0.1 to 10, particularly preferably 0.2 to 3.0 wt. %, in relation to the solids content of the coating. A dose of from 200 to 3000 mJ/cm$^2$, measured within the wavelength range 200 to 600 nm, is preferably used to cure these coatings.

Coatings according to the invention furthermore cure by the influence of thermal energy. Here, the thermal energy can be introduced into the coating by radiation, thermal conduction and/or convection, with the infrared sources, near infrared sources and/or ovens which are in common use in coating technology normally being utilised. The cross-linking reaction of the optionally blocked isocyanate groups with the isocyanate-reactive groups of the coating agent is initiated by the supplying of thermal energy. If free isocyanate groups are available in the coating agent, the available ambient heat may optionally be sufficient for gradual curing, such that no additional thermal energy need be introduced into the system.

Since two independent chemical mechanisms are set in motion by the influence of actinic radiation and thermal energy, the actinic radiation/thermal energy sequence, and hence the sequence in which the mechanisms proceed, can be combined and varied at will. Optionally present organic solvent and/or water is preferably first removed by the methods which are conventional in coating technology. In a preferred variant, complete or partial curing is then initially effected by the influence of actinic radiation. The thermal curing can take place immediately afterwards or later, as well as in the same or a separate place. In this way it is, for example, possible initially to produce flexible coatings which survive, undamaged, a deformation of the substrate, and subsequently to cure these further in thermal manner. In this way it is, for example, possible to coat optionally already coated metal in the form of so-called coils, and first to cure the coatings to give a flexible coating by the influence of actinic radiation. Specific parts can then be extracted from the coated coils by processes such as punching, which are known to those skilled in the art, and mechanically reshaped without the coating sustaining damage and cracking, for example. The cross-linking reaction of the, for example, blocked isocyanate groups with the isocyanate-reactive groups of the coating agent is subsequently initiated by thermal energy, such that highly resistant coatings result which are also suitable, for example, as clear coats for automotive bodies or for components used in automotive construction.

EXAMPLES

Acid value: expressed as mg KOH/g of sample, titration with 0.1 mol/l NaOH solution using bromothymol blue indicator (ethanolic solution), colour change from yellow, through green to blue, based on DIN 3682.

Hydroxyl value: expressed as mg KOH/g of sample, titration with 0.1 mol/l methanolic KOH solution after cold acetylation with acetic anhydride catalysed with dimethylaminopyridine, based on DIN 53240.

Epoxide value: the sample, dissolved in methylene chloride/ethanoic acid, is titrated with a perchloric acid solution (0.1 mol/l) following the addition of tetrabutylammonium iodide. Here, the amine which is liberated as well as basic amine which is present is collected. The basic (free) amine is determined in analogous manner, but without the addition of tetrabutylammonium iodide. The percentage epoxide content, calculated as CH—O—CH (MG=42 g/mol) results from the difference. Based on DIN 16945.

Isocyanate content: expressed as a percentage, back-titration with 0.1 mol/l hydrochloric acid following reaction with butylamine. Based on DIN EN ISO 11909.

Gel permeation chromatography (GPC): eluant THF, RI detection, integration following calibration with polystyrene standards.

Viscosities: rotation viscometer, measurements at 23° C. and 250/s shear gradient for reactions of glycidyl methacrylate with acrylic acid, or 40/s shear gradient for reactions of polyisocyanates.

Percentages are by weight, unless otherwise indicated.

Reaction of Glycidyl Methacrylate with Acrylic Acid:

In each case 13.27 g glycidyl methacrylate, 0.02 g 2,6-di-tert.-butyl-4-methylphenol, 6.78 g acrylic acid and in each case 0.10 g catalyst in accordance with Table 1 were reacted in a glass vessel having a small opening, with magnetic stirring at 90° C. The acid value was determined after 24 hours. If this exceeded 4 mg KOH/g stirring was continued for a further 24 h at 90° C. and the acid value s determined again.

TABLE 1

Experimental series at 90° C.

| Ex. | Catalyst | Acid value after 24 h (mg KOH/g) | Acid value after 48 h (mg KOH/g) | Hydroxyl value (mg KOH/g) | GPC main signal (% of area) | Observation |
|---|---|---|---|---|---|---|
| 1 | Tetrabutylammonium hydroxide | 9.2 | 1.2 | 222 | 70 | |
| 2 | Triethylamine | 5.3 | 0.8 | 220 | 68 | yellow |
| 3 | Fascat 4100*$^)$ | 7.0 | 3.8 | 208 | 58 | |
| 4 | Caesium chloride | 5.9 | 0.7 | 224 | 70 | yellow |

TABLE 1-continued

Experimental series at 90° C.

| Ex. | Catalyst | Acid value after 24 h (mg KOH/g) | Acid value after 48 h (mg KOH/g) | Hydroxyl value (mg KOH/g) | GPC main signal (% of area) | Observation |
|---|---|---|---|---|---|---|
| 5 | Tetrabutyl-phosphonium bromide | 6.2 | 0.8 | 219 | 71 | yellow |
| 6 | Dizabicyclooctane | 9.0 | 1.9 | 232 | 80 | yellow |
| 7 | Dibutylphosphate | 12.4 | 6.0 | — | — | — |
| 8 | Tin(II) octoate | 9.3 | 7.4 | — | — | viscous |
| 9 | Dibutyltin dilaurate | 12.3 | 6.4 | — | — | — |
| 10 | Thiodiglycol | 8.5 | 4.4 | — | — | — |
| 11 | Triethylbenzyl-ammonium chloride | 2.7 | — | 245 | 84 | — |
| 12 | Triphenyl phosphine | 1.3 | — | 224 | 68 | — |
| 13 | Dimethylamino pyridine | 1.4 | — | 249 | 85 | yellow |

*)tin-containing catalyst, from Elf-Atochem

All the catalysts investigated show sufficient activity. After as little as 24 hours, the products from Examples 11 to 13 have very low acid values. Examples 11 to 13 were repeated at a reaction temperature of 80° C. (Table 2).

TABLE 2

Experimental series at 80° C.

| Ex. | Catalyst | Acid value after 24 h (mg KOH/g) | Acid value after 48 h (mg KOH/g) | Hydroxyl value (mg KOH/g) | GPC main signal (% of area) | Observation |
|---|---|---|---|---|---|---|
| 14 | Triethylbenzyl-ammonium chloride | 9.2 | 2.1 | 243 | 79 | — |
| 15 | Triphenyl phosphine | 6.3 | 1.0 | 220 | 75 | — |
| 16 | Dimethylamino pyridine | 5.7 | 1.6 | 244 | 82 | yellow |

The catalysts are still active even at 80° C.

Example 17 and Comparison Example VI 9290 g glycidyl methacrylate, 70.0 g triphenyl phosphine and 14.0 g 2,6-di-tert.-butyl-4-methylphenol were introduced into a 15 l stirred vessel. Air was passed through the reaction mixture at 5 l/hour, as well as nitrogen being passed over it at 10 l/h. The mixture was heated to 70° C., with stirring. At this temperature 4710 g acrylic acid were dispensed in within 5 hours. The temperature rose to 81° C. on commencement and was then held between 65 and 70° C. After the addition was finished the temperature was increased to 90° C. After 6 h at 90° C. an acid value of 9.4 mg KOH/g was determined on an extracted sample. A further 14.0 g triphenyl phosphine were then added. After a further 6 h at 90° C. an acid value of 1.8 mg KOH/g was determined on an extracted sample. Cooling then took place. The epoxide content was 0.60%. A sample of this product (VI) was removed and provided for comparative testing. The remainder was stirred for a further 24 h at 90° C. The epoxide content was 0.10%. Characteristic data, in each case after storage for 24 h at room temperature:

| | Viscosity | Hydroxyl value | Acid value | Epoxide content | Colour index (APHA) |
|---|---|---|---|---|---|
| Comp. Ex. VI | 233 mPas | 233 | 0.9 | 0.60% | 18 |
| Ex. 17 | 245 mPas | 228 | 0.6 | 0.10% | 25 |

Example 18

Example 17 was repeated with the following changes: amounts weighed in: 8484 g glycidyl methacrylate, 45.5 g triphenyl phosphine and 13.0 g 2,6-di-tert.-butyl-4-methylphenol, as well as 4517 g acrylic acid and 13.0 g triphenyl phosphine as a second portion. After dispensing of the acrylic acid was finished, it was 13 hours before an acid value of 9.5 mg KOH/g was measured. After the addition of the second portion of triphenyl phosphine, it was 15 h before an acid value of 3.8 was obtained.

Characteristic data after storage for 24 h at room temperature:

|  | Viscosity | Hydroxyl value | Acid value | Epoxide content | Colour index (APHA) |
|---|---|---|---|---|---|
| Ex. 18 | 65 mPas | 228 | 3.5 | 0.10% | 29 |

Example 19

Example 17 was repeated with the following changes: apparatus 2-liter glass flask, amounts weighed in: 391.5 g glycidyl methacrylate, 1.20 g triphenyl phosphine and 0.60 g 2,6-di-tert.-butyl-4-methylphenol, as well as 208.5 g acrylic acid and 0.60 g triphenyl phosphine as a second portion. The introduction of air was reduced to 0.5 l/h. No nitrogen was passed over. After dispensing of the acrylic acid was finished within 1 h, it was 20 h before an acid value of 9.5 mg KOH/g was measured. After the addition of the second portion of triphenyl phosphine, it was 23 h before an acid value of 3.1 was obtained.

Characteristic data after storage for 24 h at room temperature:

|  | Viscosity | Hydroxyl value | Acid value | Epoxide content | Colour index (APHA) |
|---|---|---|---|---|---|
| Ex. 19 | 76 mPas | 232 | 3.0 | <0.10% | 85 |

Comparison Example V2

Example 19 was repeated with the following changes: apparatus 2-liter glass flask, 9.00 g triethylbenzylammonium chloride were used in place of triphenyl phosphine. Further amounts weighed in: 1214.3 g glycidyl methacrylate, 1.80 g 2,6-di-tert.-butyl-4-methylphenol, as well as 585.7 g acrylic acid. The second portion of catalyst was omitted. Acrylic acid dispensed in over a period of 4 h, an acid value of 0.3 was determined following a post-reaction time of 24 h.

Characteristic data after storage for 24 h at room temperature:

|  | Viscosity | Hydroxyl value | Acid value | Epoxide content | Colour index (APHA) |
|---|---|---|---|---|---|
| Comp. Ex. V2 | 80 mPas | 228 | 0.3 | 0.80% | 80 |

Reaction with Polyisocyanates

Comparison Example V3

159.4 g Desmodur® N3300 (hexamethylene diisocyanate-based polyisocyanate having a predominantly isocyanurate structure, NCO content 21.8%, viscosity 3000 mPas/23° C., Bayer A G, Leverkusen, Germany), 0.23 g 2,6-di-tert.-butyl-4-methylphenol and 25.0 g n-butyl acetate were weighed into a 2-liter glass flask with a stirrer and gas inlet (0.3 l/h air). The batch was then heated to 60° C., with stirring, and 65.6 g of the product obtained in Comparison Example V2 (epoxide content 0.8%) were added within 25 min. Stirring was continued at 60° C., approximately 30 min after the addition was finished a strong exothermic reaction set in. The reaction mixture heated up to over 150° C. and solidified to give a very hard polymer.

Comparison Examples V4-V10

159.4 g Desmodur® N3300 (hexamethylene diisocyanate-based polyisocyanate having a predominantly isocyanurate structure, NCO content 21.8%, viscosity 3000 mPas/23° C., Bayer A G, Leverkusen, Germany), 0.23 g 2,6-di-tert.-butyl-4-methylphenol and 25.0 g n-butyl acetate were weighed into a 2-liter glass flask with a stirrer and gas inlet (0.3 l/h air). In accordance with Table 3 a stabiliser for the isocyanate groups was optionally added (see column headed "Chain stopper in initial batch"). The batch was then heated to 60° C., with stirring, and 65.6 g of the product obtained in Comparison Example VI (epoxide content 0.6%) were added within 25 min. Stirring was continued at 60° C. until the isocyanate content of a sample was less than 9.3%. In accordance with Table 3 a stabiliser for the isocyanate groups was optionally added (see column headed "Chain stopper at end"). The products were stored in sealed glass bottles at room temperature and at 60° C., respectively.

Comparison Example V11

Comparison Example V4 was repeated, however now using 3-acryloyloxy-2-hydroxypropyl methacrylate (epoxide content 0.25%, Sigma-Aldrich GmbH, Steinheim, Germany), in place of the product obtained in V1.

Comparison Example V12

Comparison Example V4 was repeated, however now using glycerol dimethacrylate (Degussa/Röhm, Darmstadt, Germany) in place of the product obtained in V1. The reaction batch gelled after 2 h with no observed exothermic reaction.

Example 20

Comparison Example V4 was repeated, however using the product of Example 17 (epoxide content 0.1%), in place of the product obtained in V1.

TABLE 3

| Ex. | Chain stopper in initial batch | Chain stopper at end | Storage at room temperature | Storage at 60° C. |
|---|---|---|---|---|
| V4 | None | None | Gelled after 11 days | Gelled after 4 days |
| V5 | Benzoyl chloride 0.02 wt. % | None | Gelled after 20 days | Gelled after 4 days |
| V6 | None | Benzoyl chloride 0.02 wt. % | Gelled after 16 days | Gelled after 5 days |
| V7 | 4-toluenesulfonic acid 0.02 wt. % | None | Gelled after 15 days | Gelled after 5 days |
| V8 | None | 4-toluenesulfonic acid 0.02 wt. % | Gelled after 15 days | Gelled after 5 days |
| V9 | Dibutylphosphate 0.02 wt. % | None | Gelled after 21 days | Gelled after 8 days |
| V10 | None | Dibutylphosphate 0.02 wt. % | Gelled after 21 days | Gelled after 8 days |
| V11 | None | None | Gelled after 16 days | Gelled after 6 days |
| 20 | None | None | Terminated after 21 days with no result | Terminated after 21 days with no result |

Comparison Example 13

3299 g Desmodur® XP 2410 (hexamethylene diisocyanate-based polyisocyanate having predominantly isocyanurate and iminooxadiazine dione structural units, NCO content 23.0 wt. %, viscosity 700 mPas/23° C., Bayer A G, Leverkusen, Germany), 4.95 g 2,6-di-tert.-butyl-4-methylphenol, 0.99 g benzoyl chloride and 550 g n-butyl acetate were weighed into a 6-liter glass flask with a stirrer and gas inlet (0.4 l/h air). The mixture was heated to 60° C., with stirring. At this temperature 1651 g of the product of Comparison Example V1 were dispensed in within 6 h. Stirring was continued for 3 h after the dispensing was finished, until the NCO content was around 9.1%. A further 4.95 g 2,6-di-tert.-butyl-4-methylphenol were stirred in and cooling took place.

Characteristic data after storage for 24 h at room temperature:

| | Viscosity | Solids content | NCO content | Colour index (APHA) |
|---|---|---|---|---|
| Comp. Ex. V13 | 2050 mPas | 89.6% | 9.0% | 25 |

The product was stored in sealed glass bottles at room temperature and at 60° C., respectively. In both cases gelling took place within 8 days.

Example 21

500 g Desmodur® XP 2410, 0.76 g 2,6-di-tert.-butyl-4-methylphenol, 0.15 g dibutyl phosphate and 190 g n-butyl acetate were weighed into a 2-liter glass flask with a stirrer and gas inlet (0.3 l/h air). The mixture was heated to 60° C., with stirring. At this temperature 260 g of the product of Example 19 (epoxide content <0.1 %) were dispensed in within 2 h. Stirring was continued for 9 h after the dispensing was finished, until the NCO content was around 9.1%.

Characteristic data after storage for 24 h at room temperature:

| | Viscosity | Solids content | NCO content | Colour index (APHA) |
|---|---|---|---|---|
| Ex. 21 | 280 mPas | 79.1% | 9.1% | 50 |

The product was stored in sealed glass bottles at room temperature and at 60° C., respectively. Storage was terminated after 2 months. Neither sample was gelled.

Example 22

665 g Desmodur® Z4470 (isophorone diisocyanate-based polyisocyanate having predominantly isocyanurate structural units, 70% in n-butyl acetate, NCO content 11.9%, viscosity 600 mPas/23° C., Bayer A G, Leverkusen, Germany), 0.67 g 2,6-di-tert.-butyl-4-methylphenol, 0.13 g benzoyl chloride and 85 g n-butyl acetate were weighed into a 2-liter glass flask with a stirrer and gas inlet (0.3 l/h air). The mixture was heated to 60° C., with stirring. At this temperature 126.2 g of the product of Example 18 (epoxide content 0.1%) were dispensed in within 3 h. Stirring was continued for 8 h after the dispensing was finished, until the NCO content was around 5.5%.

Characteristic data after storage for 24 h at room temperature:

| | Viscosity | Solids content | NCO content | Colour index (APHA) |
|---|---|---|---|---|
| Ex. 22 | 650 mPas | 70.3% | 5.5% | 31 |

Example 23

Blocked Dual-cure Hardener for Incorporation in Water-based Coating Systems such as Dispersions or Slurries 1299.0 g Desmodur® N3300, 2.48 g 2,6-di-tert.-butyl-4-methylphenol, 0.01 g dibutyltin dilaurate and 620.2 g 2-butanone were weighed into a 4-liter glass flask with a stirrer and gas inlet (0.4 l/h air). The mixture was heated to 60° C., with stirring. At this temperature 287.8 g 3,5-dimethyl pyrazole were added portion-wise within 3 h. Stirring then continued for approx. 2 h until an NCO content of 7.0% was obtained. 893.3 g of the product of Example 19 (epoxide content <0.1%) were then dispensed in within 7 h. Stirring was continued for a further 12 h after the dispensing was finished, until the NCO content was less than 0.1%.

| | Viscosity | Solids content | NCO content | Colour index (APHA) |
|---|---|---|---|---|
| Ex. 23 | 1300 mPas | 79.5% | <0.1% (4.0% unblocked) | 121 |

Example 24

Blocked and Potentially Hydrophilised Dual-cure Hardener for Incorporation in Water-based Coating Systems such as Dispersions or Slurries 2190 g Desmodur® N3300, 4.00 g 2,6-di-tert.-butyl-4-methylphenol, 0.02 g dibutyltin dilaurate and 1000 g dibasic ester (solvent from Dupont) were weighed into a 6-liter glass flask with a stirrer and gas inlet (0.5 l/h air). The mixture was heated to 60° C., with stirring. At this temperature, within 3 h 690.8 g 3,5-dimethyl pyrazole were dispensed in portion-wise, followed by 132.6 g hydroxypivalic acid. Stirring was then continued for approx. 3 h until an NCO content of 3.1% was obtained. 986.2 g of the product of Example 19 (epoxide content <0.1%) were then dispensed in within 2 h. Stirring was continued for a further 12 h at 70° C. after the dispensing was finished, until the NCO content was less than 0.1%.

Characteristic data after storage for 24 h at room temperature:

| | Viscosity | Solids content | Acid value | NCO content | Colour index (APHA) |
|---|---|---|---|---|---|
| Ex. 24 | 18600 mPas | 79.6% | 10.4 | <0.1% (6.0% blocked) | 75 |

Example 25

Ionically Hydrophilised Dual-cure Hardener for Incorporation into Water-based 2-component Coating Agents 474 g Desmodur® XP 2410, 0.80 g 2,6-di-tert.-butyl-4-methylphenol and 0.01 g dibutyltin dilaurate were weighed into a 2-liter glass flask with a stirrer and gas inlet (0.3 l/h air). The mixture was heated to 60° C., with stirring. At this temperature 326 g of the product of Example 17 (epoxide content 0.1%) were dispensed in within 2 h. Stirring was continued for a further 2 h after the dispensing was finished, until the NCO content was around 7.0%. 10.4 g N,N-dimethylcyclohexylamine were then added, followed by 24.0 g N-cyclohexyl-3-aminopropanesulfonic acid. The batch was thinned by the addition of 200 g N-methyl pyrrolidone, and stirring was continued for a further 5 h at 60° C.

Characteristic data after storage for 24 h at room temperature:

|  | Viscosity | Solids content | NCO content |
| --- | --- | --- | --- |
| Ex. 25 | 5700 mPas | 80.1% | 7.1% |

Technical Application Examples

Comparison Example 26 and Example 27

Production of Dual-cure Clear Coats and Coatings

Preparation of Base Paint V26 (Component A)

19.27 g Desmophen® VP LS 2089 (hydroxyl-functional polyester, Bayer A G, Leverkusen, Germany, 75% in butyl acetate, having an OH content in accordance with DIN 53 240/2 of 6.0%), 1.31 g Tinuvin® 292 (light stabiliser of the HALS type, Ciba SC Inc., Basle, Switzerland, 50% in butyl acetate), 1.31 g Tinuvin® 400 (light stabiliser, UV absorber, Ciba SC Inc., Basle, Switzerland, 50% in butyl acetate), 0.33 g Byk® 306 (flow promoter, solution of a polyether-modified polydimethyl siloxane, Byk Chemie GmbH, Wesel, Germany, 12.5% in xylene/monophenyl glycol 7/2), 1.96 g of the mixture of Irgacure® 184/Lucirin® TPO (2:1), 50% in butyl acetate (Irgacure® 184: photoinitiator, 1-hydroxycyclohexyl phenylketone, Ciba SC Inc., Basle, Switzerland), (Lucirin® TPO: photoinitiator, diphenyl(2,4,6-trimethylbenzene)phosphine oxide, BASF A G, Ludwigshafen) and 15.76 g butyl acetate (thinner) were added to 20.65 g Desmophen® A 870 (hydroxyl-functional polyacrylate polymer, BAYER A G, Leverkusen, Germany, 70% in butyl acetate, having an OH content in accordance with DIN 53 240/2 of 3.0%), and the mixture was stirred until homogeneous.

Preparation of the Hardener Solution V26 (Component B)

10.23 g of an isocyanate group-containing urethane acrylate prepared in a manner analogous to Example 1 of EP-A 0 928 800, based on the isophorone diisocyanate oligomer Desmodur® Z4470 BA (Bayer A G, Leverkusen, Germany, 70% in butyl acetate, having an NCO content in accordance with DIN EN ISO 11909 of 1.8%), 71.3% in butyl acetate, having an NCO content in accordance with DIN EN ISO 11909 of 6.7%) were added to 29.18 g Roskydal® UA VP LS 2337 (isocyanate group-containing urethane acrylate from Bayer A G, Leverkusen, Germany: 100% concentration, having an NCO content in accordance with DIN EN ISO 11909 of 12.8%), and the mixture was stirred until homogeneous.

Preparation of Base Paint 27 (Component A)

By analogy with V26 the following were utilised: 19.28 g Desmophen® A 870, 18.00 g Desmophen® VP LS 2089, 1.31 g Tinuvin® 292 (50% in butyl acetate, 1.31 g Tinuvin® 400 (50% in butyl acetate), 0.33 g Byk®, 1.96 g of the mixture of Irgacure® 184/Lucirin® TPO (2:1), 50% in butyl acetate, 8.47 g butyl acetate.

Preparation of the Hardener Solution 27 (Component B)

By analogy with V26 the following were utilised: 38.58 g of the dual-cure hardener obtained in Example 21, 10.77 g of an isocyanate group-containing urethane acrylate based on the isophorone diisocyanate oligomer Desmodur® Z4470 as described for V26.

Mixing of the Base Paint with the Hardener Solution (Both V26 and V27)

The Components A and B indicated above were in each case mixed together, and the mixtures were mixed intimately. The mixtures were then in each case applied by air gun to aluminium sheets pre-coated with black base coat, followed by flash-off for 5 min, after which they were pre-dried at 80° C. for 10 min. After UV irradiation (mercury medium-pressure source, IST Metz GmbH, Nürtingen, Germany, 1500 mJ/cm$^2$), followed by 20 min stoving in a circulating air oven at 140° C., coatings having a dry film thickness of approx. 40 μm were obtained. In order to determine the properties of the films when not UV-cured, corresponding coatings were produced which were not UV-cured. In each case, brilliant, high-gloss coatings were obtained. The Table which follows gives a breakdown of the paint properties obtained for the coatings.

| Variable | V26 | Example 27 |
| --- | --- | --- |
| Partial solubility X/MPA/EA/AC 1 min/5 min | 0011/1122 | 0000/0012 |
| Partial solubility (without UV curing) | 3344/– | 3344/– |
| Pendulum hardness (without UV curing) | 100 | 132 |
| Scratch resistance (with 56 hours' brush operation) | | |
| Gloss 20° before scratching | 90.1 | 89.9 |
| Gloss 20° after scratching | 42.2 | 46.2 |
| Residual gloss, as % | 46.8% | 51.4% |
| Gloss 20° after reflow 2 h 60° C. | 65.2 | 61.9 |
| Residual gloss, as % | 72.4% | 68.9% |
| Daimler-Chrysler temperature gradient oven test[*] | | |
| Tree resin | 62 | >68 |
| Brake fluid | 36 | 36 |
| Pancreatin | 36 | 36 |
| NaOH, 1% | 36 | 40 |
| H$_2$SO$_4$, 1% | 45 | 48 |

[*]visible damage after 1 hour at a temperature of [° C.]

Test Methods:

Partial solubility: The following solvents having increasing dissolving power were contained in a wooden support having fixed in it 4 vertically positioned glass tubes (external diameter approx. 15 mm): 1.) xylene (X), 2.) 1-methoxypropyl acetate-2 (MPA), 3.) ethyl acetate (EA), 4.) acetone (AC). They were closed with a wad of cotton wool. These were placed on the clear coat film in such a way that the openings of the tubes with the cotton wool plugs bore on the clear coat film. Complete wetting of the film with the solvents is important. After 1 and 5 minutes, respectively, these glass tubes were removed, and the solvent residues were wiped off with an absorbent cloth. The paint surfaces were assessed in accordance with the scheme indicated.

The Evaluation Scale Denotes:
0: no change,
1: a trace of change (swelling ring is very slight, discernible only by a trace, swelling ring is clearly incomplete),
2: slight change (swelling ring is discernible in the light; scratches discernible),
3: moderate change (unbroken swelling ring is clearly discernible; slightly scrapable),
4: markedly changed (unbroken swelling ring is very conspicuous; scrapable),
5: film destroyed (marked swelling/wrinkling/partial dissolution).

Scratch Resistance

The scratch resistance was determined in accordance with the DIN 55668 method for "Testing the scratch resistance of coatings using a laboratory washing installation".

Pendulum Hardness:

The pendulum hardness was determined in accordance with DIN EN ISO 1522.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one-component or multi-component coating agent comprising
    C1) one or more polyisocyanates having at least one ethylenic unsaturation and an isocyanate group content of 0.5-25 wt. %, and prepared by a process comprising reacting: a reaction mixture comprising at least one diisocyanate or polyisocyanate A with the product B of the reaction of B1 acrylic acid, methacrylic acid and/or dimeric acrylic acid and B2 glycidyl methacrylate and/ or glycidyl acrylate, wherein B contains less than 0.2 wt. % of epoxide groups (calculated as M=42),
    C2) one or more compounds which have at least one isocyanate-reactive group and optionally comprise one or more functional groups which under the influence of actinic radiation react with ethylenically unsaturated compounds, with polymerization,
    C3) optionally further polyisocyanates, which optionally comprise one or more functional groups which under the influence of actinic radiation react with ethylenically unsaturated compounds, with polymerization,
    C4) optionally compounds bearing functional groups which under the influence of actinic radiation react with ethylenically unsaturated compounds, with polymerization, which have neither isocyanate groups nor isocyanate-reactive groups,
    C5) optionally catalysts,
    C6) optionally auxiliary agents and additives, and
    C7) optionally products of reactions between the components C1) to C6).

2. A method of coating a substrate comprising applying the coating agents according to claim 1 to at least a portion of the substrate.

3. Substrates coated with coating agents according to claim 1.

4. Substrates according to claim 3, wherein the substrates are automotive bodies or automotive construction parts.

5. A one-component or multi-component coating agent according to claim 1, wherein the reaction of B1 with B2 is carried out at an equivalence ratio of acid to epoxide of 1.01 to 1.20.

6. Substrates coated with coating agents according to claim 5.

7. Substrates according to claim 6, wherein the substrates are automotive bodies or automotive construction pads.

8. A one-component or multi-component coating agent according to claim 1, wherein the reaction of B1 with B2 is carried out, or the reaction product is post-treated, such that the reaction product has a maximum acid value of 10 mg/g KOH.

9. A one-component or multi-component coating agent according to claim 1, wherein the reaction of B1 with B2 is carried out in the presence of a catalyst selected from the group consisting of phosphine, phosphonium, caesium, and potassium compounds.

10. Substrates coated with coating agents according to claim 8.

11. Substrates according to claim 10, wherein the substrates are automotive bodies or automotive construction pads.

12. Substrates coated with coating agents according to claim 9.

13. Substrates according to claim 12, wherein the substrates are automotive bodies or automotive construction pads.

* * * * *